United States Patent [19]

Hälldahl

[11] Patent Number: 4,749,529

[45] Date of Patent: Jun. 7, 1988

[54] METHOD OF MANUFACTURING SINTERED NUCLEAR FUEL BODIES

[75] Inventor: Lars Hälldahl, Västerås, Sweden

[73] Assignee: Aktiebolaget ASEA-ATOM, Västerås, Sweden

[21] Appl. No.: 907,217

[22] Filed: Sep. 15, 1986

[30] Foreign Application Priority Data

Sep. 18, 1985 [SE] Sweden .............................. 8504325

[51] Int. Cl.$^4$ ...................... G21C 21/00; C09K 11/04; G21G 4/00

[52] U.S. Cl. ..................... 264/0.5; 252/638; 252/643; 264/56; 264/65; 264/125; 376/339; 376/419; 376/421; 423/261

[58] Field of Search .............. 252/636, 637, 638, 643; 264/0.5, 56, 65, 125; 376/339, 419–422, 414; 423/11, 15, 3, 261, 260

[56] References Cited

U.S. PATENT DOCUMENTS

| | | | |
|---|---|---|---|
| 3,122,509 | 2/1964 | Handwerk et al. | 252/638 |
| 3,361,857 | 1/1968 | Rose | 376/419 |
| 3,759,786 | 9/1973 | Abate-Daga et al. | 376/419 |
| 3,872,022 | 3/1975 | De Hollander et al. | 252/638 |
| 3,917,768 | 11/1975 | Abate-Daga et al. | 264/0.5 |
| 4,052,330 | 10/1977 | Jensen et al. | 264/0.5 |
| 4,278,560 | 7/1981 | Sondermann | 376/419 |
| 4,348,339 | 9/1982 | Assmann et al. | 252/643 |
| 4,355,002 | 10/1982 | Hosokawa et al. | 376/419 |
| 4,512,939 | 4/1985 | Dorr et al. | 252/638 |
| 4,636,352 | 1/1987 | Boyle | 376/419 |

Primary Examiner—Stephen J. Lechert, Jr.
Assistant Examiner—Howard J. Locker
Attorney, Agent, or Firm—Watson, Cole, Grindle & Watson

[57] ABSTRACT

Sintered nuclear fuel bodies are manufactured by pressing a powder of $UO_2$ containing 1–20 percent by weight $Gd_2O_3$ and up to 20 percent by weight $U_3O_8$ into a pressed body and sintering the pressed body, the $Gd_2O_3$ at least partly consisting of monoclinic $Gd_2O_3$. The monoclinic $Gd_2O_3$ used can be manufactured by heat treatment of cubic $Gd_2O_3$ at a temperature of at least 1250° C. By employing monoclinic $Gd_2O_3$ a considerably increased homogeneity with respect to solid solution of gadolinium in the $UO_2$ structure is obtained. Particularly favorable results are obtained if the sintering is carried out in a sintering atmosphere which, at 1750° C., has an oxygen partial pressure which is higher than $10^{-7}$ atm.

8 Claims, 1 Drawing Sheet

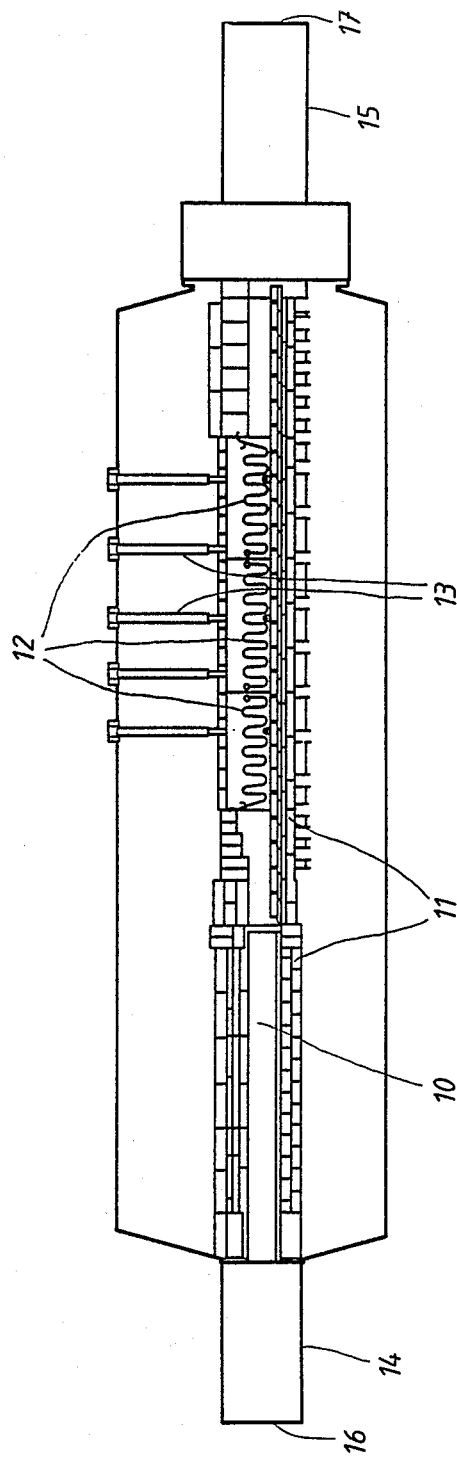

METHOD OF MANUFACTURING SINTERED NUCLEAR FUEL BODIES

BACKGROUND OF THE INVENTION

The present invention relates to a method manufacturing sintered nuclear fuel bodies by pressing of a powder of $UO_2$ containing 1-20 percent by weight $Gd_2O_3$, and possibly containing up to 20 percent by weight $U_3O_8$, into a pressed body and sintering the pressed body.

THE PRIOR ART

When manufacturing pellets of uranium dioxide for use as fuel in nuclear reactors, powder of uranium dioxide is pressed into pellets, which are sintered and ground to accurate dimension. A large number of such pellets are stacked on top of each other in a cladding tube, usually of zircaloy, with a small gap between the envelope surface of the pellets and the inside of the cladding tube. The cladding tube is sealed by end plugs welded to the tube. The cladding tube is filled with helium under pressure. Such a finished cladding tube is usually designated a fuel element or a fuel rod.

In a fuel rod bundle, which often contains $8 \times 8$ fuel rods, sometimes $6 \times 6$, $7 \times 7$ or $9 \times 9$ fuel rods, there may be placed, instead of one or more fuel rods with uranium dioxide pellets, rods containing pellets with a burnable neutron absorber material in the form of gadolinium dissolved in the uranium dioxide structure (possibly added $U_3O_8$ is reduced during the sintering to $UO_2$). In this way, an improved reactivity control can be achieved during the earlier part of an operating period of the nuclear reactor without the absorber material thereafter, when it has to a considerable extent lost its ability to absorb neutron, having any major negative influence on the operation of the reactor. However, a certain residual absorption remains.

When manufacturing the known pellets containing an absorber material, $Gd_2O_3$ with a cubic crystal lattice is used, which is the commercially available modification of $Gd_2O_3$. During the sintering of the pellets, gadolinium atoms enter the $UO_2$ lattice and replace individual uranium atoms therein. A solid solution is then formed.

SUMMARY OF THE INVENTION

According to the present invention, it been proved that the use of $Gd_2O_3$ having a monocline structure gives a sintered pellet with considerably increased homogeneity with regard to solid solution of gadolinium in the $UO_2$ lattice, that is, a pellet in which a considerably greater part of the gadolinium atoms has entered and replaced uranium atoms in the $UO_2$ lattice and thereby formed a product in which the proportion of gadolinium is more evenly distributed in the entire product. This results in the sintered pellets acquiring a more uniform quality and with properties which can be predetermined in a more reliable manner, especially as regards absorption of neutrons and stability under the operating conditions of the reactor. Thus the dimensions and hence the gap between pellet and cladding tube can be maintained at predetermined and optimum values.

A probable explanation of the favourable results obtained according to the invention is the following. Under the conditions used during the sintering, cubic $Gd_2O_3$ changes from cubic to monocline phase. Since monoclinic $Gd_2O_3$ has a higher density than cubic $Gd_2O_3$, that is, a smaller volume in a certain quantity of $Gd_2O_3$, the phase transformation means a volumetric reduction of the $Gd_2O_3$ crystallites, so that gaps or spaces form, and a deteriorated contact, caused by these gaps or spaces, may arise between the $Gd_2O_3$ crystallites and the $UO_2$ crystallites. When using a monoclinic $Gd_2O_3$ as starting material instead of cubic $Gd_2O_3$, no phase transformation of $Gd_2O_3$ takes place during the sintering and therefore no formation of gaps or spaces between the $Gd_2O_3$ crystallites and the $UO_2$ crystallites. In that way, gadolinium atoms would enter the uranium dioxide lattice in a more efficient way and replace uranium atoms therein. The powder of uranium dioxide may contain up to 20 percent by weight $U_3O_8$ to attain a desired density of the sintered body and a desired stability thereof, so that the body does not undergo successive shrinkage or swelling when being subjected to stresses during operation in a reactor. The quantity of $Gd_2O_3$ in the powder amounts to 1-20 percent by weight. By percentage by weight of a substance in uranium dioxide in this application is meant the weight of the substance in question in percentage of the total weight of the substance, the uranium dioxide and any other substances which may be included in the powder.

Monoclinic $Gd_2O_3$ may be produced by heat treatment of commercial cubic $Gd_2O_3$ in air or other non-reactive atmosphere at a temperature of at least 1250° C. and preferably at most 1400° C. The requisite time of treatment at 1350° C. is around 4 hours.

The powder of $UO_2$ suitably consists of a ground powder having an average particle size of 0.2-15 microns, preferably 1-5 microns.

The average particle size of the powder of monoclinic $Gd_2O_3$ suitably amounts to 0.2-10 microns and preferably to 1-5 microns. The average particle size of the powder of $U_3O_8$ suitably amounts to 0.2-10 microns and preferably to 1-5 microns.

The pressing and the sintering of the powder can be carried out in a conventional manner. The pressing can suitably be carried out at a pressure of 200-450 MPa and preferably at a pressure of 250-350 MPa. The sintering may, among other things, be carried out in an atmosphere consisting of moistened hydrogen gas, usually containing 1-2 per cent by volume $H_2O$ at a temperature of 1600°-1800° C., or in an atmosphere consisting of a mixture of hydrogen gas and carbon dioxide, in which the amount of carbon dioxide may constitute up to 20 percent by volume of the total amount of hydrogen gas and carbon dioxide, at a temperature of 1600°-1800° C. Also other sintering atmospheres can be used with which an oxygen partial pressure, which at 1750° C. amounts to $10^{-10}$-$10^{-6}$ atm, can be achieved. Particularly favourable results with monoclinic $Gd_2O_3$ are obtained when using an oxygen partial pressure which at 1750° C. is higher than $10^{-7}$ atm, since in that case an increased rate of diffusion of the material, and hence a more efficient homogenization, is obtained.

The uranium dioxide in the powder which is to be sintered suitably has a composition of from $UO_{2.10}$ to $UO_{2.25}$ and preferably from $UO_{2.12}$ to $UO_{2.18}$. The finished sintered material suitably has a composition of from $(U,Gd)O_{2.00}$ to $(U,Gd)O_{2.01}$ and preferably from $(U,Gd)O_{2.000}$ to $(U,Gd)O_{2.008}$.

The invention will be explained in greater detail by way of example with reference to the accompanying FIGURE. The accompanying FIGURE schematically shows a furnace for manufacturing sintered nuclear fuel bodies according to the present invention.

DETAILED DESCRIPTION OF THE PREFERRED EMBODIMENT

The furnace according to the FIGURE is a tunnel furnace in which the actual furnace channel 10 is built up of sintered stones 10 of alumina. In the interior part of the channel 10, heating elements 12 in the form of bundles of molybdenum wire are arranged. The heating elements 12 are heated by electric current. The furnace is provided with thermocouples for measuring the temperature in various parts. The bushings for the thermocouples are designated 13. The furnace channel 10 is extended, outside the furnace, by means of parts 14 and 15 of stainless steel. During sintering of nuclear fuel bodies in the furnace, compression-moulded bodies of a powder of uranium dioxide having the composition $UO_{2.15}$ containing 10 percent by weight $Gd_2O_3$ and 10 percent by weight $U_3O_8$ are placed in "ships" of molybdenum which are passed through the furnace one after the other from one end 16 thereof to the other end 17 thereof. $Gd_2O_3$ consists of monoclinic $Gd_2O_3$, which has been manufactured by heat treatment of commercial cubic $Gd_2O_3$ in air at 1350° C. for four hours. The used powder has been manufactured by mixing a powder of the oxides stated, that is, the uranium oxides and monoclinic $Gd_2O_3$, with an average particle size of each one of 2-3 microns and prepressing of the mixture at a pressure of 100 MPa and room temperature, followed by granulation of the prepressed product and by screening of the granulated product, so that the size of the granules is less than 1.5 mm. After the granulation, 0.15% zinc stearate is intermixed, which acts as an internal lubricant. Thereafter, pressing takes place at a pressure of 300 MPa. The compression-moulded bodies have then attained their final shape for the sintering. The movement of the ships through the furnace is performed by pushing them forwards as each new ship is brought in at the end 16. Opposite to the direction of movement of the ships, that is, at the end 17 of the furnace, the gas used during sintering is supplied, in this embodiment in the form of hydrogen gas containing $H_2O$, corresponding to a relative humidity of 80% at room temperature. The sintering atmosphere has an oxygen partial pressure of around $10^{-9}$ atm at 1750° C. Since the furnace channel 10 is not provided with any partition walls, the gas may flow freely through the whole channel 10. The temperature of the nuclear fuel bodies increases from the room temperature to 1750° C. during the movement from the end 16 of the furnace and to a certain distance into the zone provided with heating elements 12. This temperature is maintained during at least the main part of the remaining movement through this zone. In connection with heating from room temperature, while using the sintering gas, mentioned above, supplied at the end 17, a reduction of the nuclear fuel material takes place so that the sintered bodies are given the composition $(U, Gd)O_{2.002}$. The time for passage of a ship through the whole furnace amounts to 20-30 hours and the dwell time in the hottest part of the zone provided with heating elements 12 is 4-6 hours. The pressed pellets have a density of 5.50 g/cm$^3$. After the sintering they have a density of 10.01 g/cm$^3$. The pellets exhibit good stability.

In an alternative embodiment, a sintering atmosphere is used consisting of a mixture of 60 percent by volume hydrogen gas and 40 percent by volume carbon dioxide having an oxygen partial pressure of around $10^{+6}$ atm at 1750° C., whereas the other conditions are unchanged.

I claim:

1. In a method of manufacturing sintered nuclear fuel bodies by the steps of (a) mixing $UO_2$ with $Gd_2O_3$ to form a powder mixture containing $UO_2$ and 1-20 percent by weight, based on the weight of the powder mixture, of $Gd_2O_3$, 20 percent $U_3O_8$, (b) pressing said powder into a pressed body, and (c) sintering said pressed body, the improvement wherein at least part of said $Gd_2O_3$ mixed with $UO_2$ in step (a) consists of monoclinic $Gd_2O_3$.

2. A method according to claim 1, wherein said monoclinic $Gd_2O_3$ is produced by heat treatment of cubic $Gd_2O_3$ at a temperature of at least 1250° C.

3. A method according to claim 1, wherein the sintering of of the pressed body in step (c) is carried out in an atmosphere which, at 1750° C., has an oxygen partial pressure of $10^{-10}$-$10^{-6}$ atm.

4. A method according to claim 1, wherein the sintering of the pressed body in step (c) is carried out in an atmosphere which, at 1750° C., has an oxygen partial pressure higher than $10^{-7}$ atm.

5. A method according to claim 1, wherein the sintering of the pressed body in step (c) is carried out at a temperature of 1600°-1800° C.

6. A method according to claim 1, wherein the sintering of the pressed body in step (c) is carried out at a temperature of 1600°-1800° C. in an atmosphere which, at 1750° C., has an oxygen partial pressure of $10^{-10}$-$10^{-6}$ atm.

7. A method according to claim 1, wherein $U_3O_8$ is mixed with $UO_2$ in step (a) such that said powder contains up to 20 percent by weight, based on the total weight of said powder mixture, of $U_3O_8$.

8. A method according to claim 1, wherein all of said $Gd_2O_3$ mixed with $UO_2$ in step (a) consists of monoclinic $Gd_2O_3$.

* * * * *